W. A. LEDFORD.
COMBINED SALT AND PEPPER SHAKER.
APPLICATION FILED SEPT. 1, 1916.
1,234,047. Patented July 17, 1917.
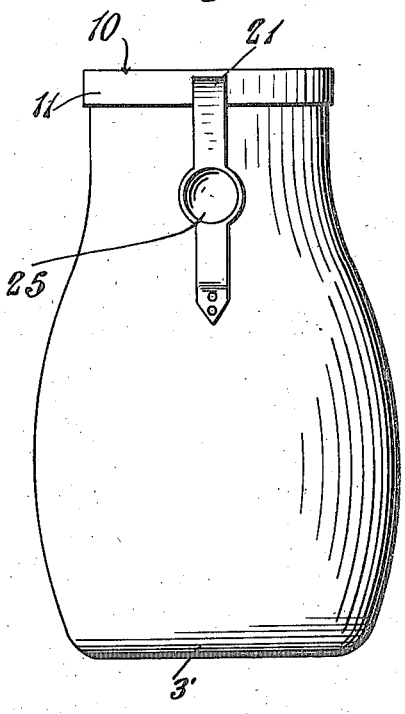
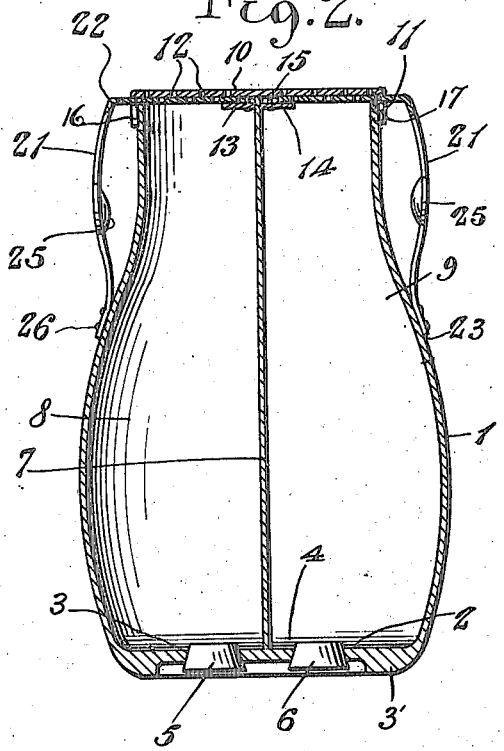
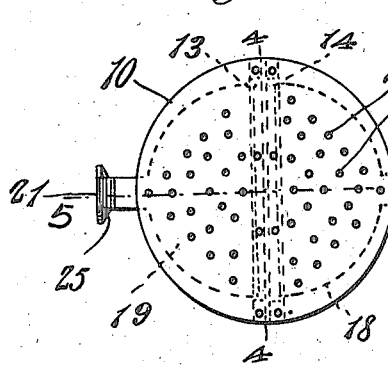
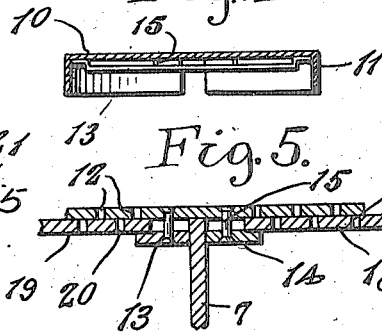
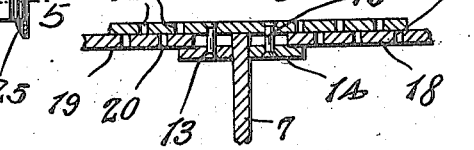
Inventor
W. A. Ledford.

UNITED STATES PATENT OFFICE.

WALTER A. LEDFORD, OF WAMIC, OREGON.

COMBINED SALT AND PEPPER SHAKER.

1,234,047. Specification of Letters Patent. Patented July 17, 1917.

Application filed September 1, 1916. Serial No. 118,081.

*To all whom it may concern:*

Be it known that I, WALTER A. LEDFORD, a citizen of the United States, residing at Wamic, in the county of Wasco and State of Oregon, have invented certain new and useful Improvements in Combined Salt and Pepper Shakers; and I do hereby declare the following to be a full, clear, and exact description of the invention, such as will enable others skilled in the art to which it appertains to make and use the same.

This invention relates to a combined salt and pepper shaker, the object of the invention being to provide for the holding of the salt and pepper in the same receptacle and permitting of the distributing of either independent of the other, or both at the same time, thus overcoming the necessity of having two shakers as heretofore has been the practice.

A further object of this invention is the provision of a combined salt and pepper shaker wherein the salt and pepper may be contained in one receptacle and either one or the other distributed independent of the other, and any fear of the contents of the receptacle becoming mixed together obviated.

A further object of this invention is to provide a combined salt and pepper shaker of this character which will be a simple, practical, and comparatively inexpensive structure which can be easily and quickly assembled, and the cost of manufacture reduced to a minimum, and its operation assured.

With these and other objects in view, the invention consists in the novel combination and arrangement of parts hereinafter more fully described and pointed out in the claim hereto appended.

In the drawings:

Figure 1 is a side elevation of my improved combined salt and pepper shaker made in accordance with this invention, Fig. 2 is a vertical sectional view of the same, Fig. 3 is a top plan view, Fig. 4 is sectional view taken on the line 4—4 of Fig. 3, and Fig. 5 is a horizontal sectional view taken on the line 5—5 of Fig. 3.

Like numerals of reference designate corresponding parts in all the figures of the drawings.

Referring more particularly to the drawings, 1 indicates the receptacle having one end fully open, the bottom 2 of the receptacle is disposed inwardly to provide the resting flange 3' which permits the receptacle to sit evenly upon a support.

The bottom 2 is provided at spaced intervals with the openings 3 and 4, in which are secured the corks or stoppers 5 and 6. Secured centrally to the inner face of the bottom is the partition 7 which extends transversely across the receptacle and its upper edge is flush with the upper edges of the open end thereof. The partition 7 is arranged centrally between the openings 3 and 4 dividing the receptacle into compartments 8 and 9, one compartment for pepper and the other compartment for salt, as will be understood.

Removably secured over the open end of the receptacle is the cover 10 having the depending flange 11 which frictionally engages the exterior of the receptacle 1, the cover is provided with a plurality of spaced openings 12 through which the contents of the compartments pass.

Secured to and depending from the under side of the cover are the supporting strips 13 and 14, which are rigidly secured in spaced relation to the cover by the rivets 15. The supporting strips extend transversely across the under side of the cover for the full length thereof, the strips are arranged in spaced relation to one another and their inner edges are located near the center of the cover to provide a space for the reception of the partition strips 7 when the cover is placed upon the receptacle 1. The flange 11 of the cover is provided at diametrically opposite points with elongated arcuate slots 16 and 17, in which is adapted to slide the perforated slides 18 and 19. The slides 18 and 19 are substantially semi-circular and are provided with a plurality of spaced openings 20 which are adapted to be normally out of alinement with the openings in the cover. The inner edges of the slides 18 and 19 rest upon the supporting strips 13 and 14, and are adapted to be actuated by flat springs 21.

The springs 21 have one end secured to the periphery of the slides centrally thereof as at 22, and their opposite ends are secured to the exterior of the receptacle 1 as at 23. The springs comprise flat body portions 24, which have the enlarged circular finger engaging portions 25 intermediate the ends thereof. The springs 21 are curved inwardly and outwardly to provide the attaching portion 26 which is secured to the exterior of the body 1 so that the same may be normally forced inwardly thereby registering the openings 20 of the slide with the openings of the cover so that the contents of the separate compartments may be dispensed therefrom.

The inner edges of the semi-circular slides abut the rivets 15 in their inward movement thereby assuring of the alinement or registration of the openings 20 with the openings 12 so that the contents of the compartments may be easily dispensed therefrom. It is also to be understood that the slides 18 and 19 have facial engagement with the under side of the cover 10, so that the contents of the compartments will be kept dry and in a sanitary condition at all times.

In operation:

The stoppers 5 and 6 are withdrawn from their openings 3 and 4 of the bottom, and the compartments are respectively filled with salt and pepper. The stoppers are then replaced, when it is desired to use either the salt or pepper, the respective spring is forced inwardly alining the slots 20 with the openings 12 and the contents drawn therefrom and the operation is repeated when the contents of the other compartment is desired.

It being understood that the circular enlarged medial portions of the springs are of different colors such as black for pepper and white for salt so that any confusion as to which compartment contains pepper and which compartment contains salt will be obviated.

The springs 21 are curved outwardly to tension the same to operate the slides to register their openings with the openings of the cover and also serve to hold the cover against accidental displacement from the receptacle.

It being understood that the outer face of the medial portions 25 are concave to provide finger gripping portions so that the fingers of the user may be placed in the depressions and the operation of the slides assured.

What is claimed is:

A combined salt and pepper shaker comprising a cylindrical body, a cover having a depending flange closing the open end of the body, said flange of the cover provided at diametrically opposite points with arcuate slots, supports secured to and depending from the under sides of the cover, a partition arranged centrally in the cylindrical body and dividing the same into separate chambers, said supports on the cover arranged on opposite sides of the partition, a pair of flat springs secured by one end to the exterior of the body and at diametrically opposite points, semi-circular slides arranged in the slots of the depending flange and having their inner ends resting upon the supports on the under side of the cover, the upper ends or free ends of said springs being secured centrally to the peripheral edge of said slide, said cover and slide provided with perforations, and the springs adapted to aline the perforations of the slides with the openings in the cover, and for the purpose specified.

In testimony whereof I affix my signature in presence of two witnesses.

WALTER A. LEDFORD.

Witnesses:
J. E. WOODCOCK,
ADELIA L. DRIVER.